(12) United States Patent
Günzel

(10) Patent No.: US 11,900,699 B2
(45) Date of Patent: Feb. 13, 2024

(54) METHOD AND DEVICE FOR MONITORING A PASSENGER OF A VEHICLE, AND SYSTEM FOR ANALYZING THE PERCEPTION OF OBJECTS

(71) Applicant: Volkswagen Aktiengesellschaft, Wolfsburg (DE)

(72) Inventor: Thorben Günzel, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 397 days.

(21) Appl. No.: 17/414,838

(22) PCT Filed: Nov. 27, 2019

(86) PCT No.: PCT/EP2019/082818
§ 371 (c)(1),
(2) Date: Jun. 16, 2021

(87) PCT Pub. No.: WO2020/126375
PCT Pub. Date: Jun. 25, 2020

(65) Prior Publication Data
US 2022/0019824 A1  Jan. 20, 2022

(30) Foreign Application Priority Data
Dec. 21, 2018  (DE) .................... 10 2018 133 445.1

(51) Int. Cl.
*G06V 20/59* (2022.01)
*G06V 20/58* (2022.01)
(Continued)

(52) U.S. Cl.
CPC ........... *G06V 20/597* (2022.01); *B60W 40/02* (2013.01); *B60W 40/08* (2013.01); *B60W 50/14* (2013.01);
(Continued)

(58) Field of Classification Search
CPC ........... G06Q 30/0265; G06Q 30/0266; G06Q 30/0241; G06Q 30/0261; G06Q 30/0242;
(Continued)

(56) References Cited

U.S. PATENT DOCUMENTS 9,607,515 B2 * 3/2017 Rider ............... G08G 1/096783
9,932,000 B2 * 4/2018 Aoki .................... G06V 20/597
(Continued)

FOREIGN PATENT DOCUMENTS

CN 105034978 A 11/2015 ............. B60R 16/02
CN 107924523 A 4/2018 ............. G06Q 30/02
(Continued)

OTHER PUBLICATIONS

International Search Report and Written Opinion, Application No. PCT/EP2019/082818, 8 pages, dated Feb. 12, 2020.
(Continued)

*Primary Examiner* — Dung Hong
(74) *Attorney, Agent, or Firm* — Slayden Grubert Beard PLLC

(57) ABSTRACT

The invention relates to a method for monitoring a passenger of a vehicle in which the geographic position of the vehicle is recorded, and a viewing direction of the passenger is recorded by means of a eye-tracking device. A data memory is accessed in which objects and geographic positions assigned to them are saved and, by using the recorded geographic position of the vehicle, it is detected whether one of the objects is located in the environment of the vehicle, and whether the object in the environment of the vehicle was perceived by the passenger depending on the recorded viewing direction of the passenger, the recorded geographic position of the vehicle, and the geographic position of the detected object in the environment of the vehicle.

20 Claims, 2 Drawing Sheets

(51) Int. Cl.
  *G06V 40/19*    (2022.01)
  *B60W 40/02*    (2006.01)
  *B60W 40/08*    (2012.01)
  *B60W 50/14*    (2020.01)
  *G06Q 30/0242*  (2023.01)
  *G06Q 30/0272*  (2023.01)
  *G09F 15/00*    (2006.01)

(52) U.S. Cl.
  CPC ..... *G06Q 30/0242* (2013.01); *G06Q 30/0272* (2013.01); *G06V 20/58* (2022.01); *G06V 40/19* (2022.01); *B60W 2420/54* (2013.01); *B60W 2540/225* (2020.02); *G06V 2201/10* (2022.01); *G09F 15/0006* (2013.01)

(58) Field of Classification Search
  CPC .. G06Q 30/0272; G06V 20/597; G06V 20/58; G06V 40/19; G06V 2201/10; B60W 40/02; B60W 40/08; B60W 50/14; B60W 2540/225; B60W 2420/54; G09F 15/0006
  See application file for complete search history.

(56) References Cited

U.S. PATENT DOCUMENTS

| | | | |
|---|---|---|---|
| 10,970,747 B2 | 4/2021 | Miller et al. | |
| 2007/0078730 A1 | 4/2007 | Serra et al. | 705/26.1 |
| 2007/0205963 A1 | 9/2007 | Piccionelli et al. | 345/7 |
| 2011/0161160 A1 | 6/2011 | Carlson et al. | 705/14.41 |
| 2012/0066007 A1 | 3/2012 | Ferrick et al. | 705/4 |
| 2012/0143693 A1 | 6/2012 | Chung et al. | 705/14.66 |
| 2014/0039788 A1 | 2/2014 | Fuehrer | 701/400 |
| 2014/0214933 A1 | 7/2014 | Liu et al. | 709/204 |
| 2014/0278910 A1 | 9/2014 | Visintainer et al. | 705/14.41 |
| 2014/0278933 A1 | 9/2014 | Mcmillan | 705/14.45 |
| 2014/0379456 A1 | 12/2014 | Miller | 705/14.41 |
| 2015/0006278 A1* | 1/2015 | Di Censo | G06V 20/597 705/14.43 |
| 2015/0142552 A1 | 5/2015 | Schmehl et al. | 705/14.41 |
| 2015/0310451 A1 | 10/2015 | Plagens et al. | 705/317 |
| 2016/0260269 A1 | 9/2016 | Pietschmann | 340/5.81 |
| 2016/0316237 A1 | 10/2016 | Couleaud et al. | 725/10 |
| 2022/0019824 A1 | 1/2022 | Günzel | |

FOREIGN PATENT DOCUMENTS

| | | | |
|---|---|---|---|
| DE | 10033333 A1 | 1/2002 | G06Q 30/00 |
| DE | 102004020878 A1 | 11/2005 | G06F 15/18 |
| DE | 102012213466 A1 | 2/2014 | B60W 30/08 |
| DE | 102014201457 A1 | 7/2014 | H04H 20/53 |
| DE | 102014204530 A1 | 9/2014 | G09F 21/04 |
| DE | 102013223680 A1 | 5/2015 | B60R 16/037 |
| DE | 102018133445 A1 | 6/2020 | B60R 16/02 |
| JP | 6694112 B2 * | 5/2020 | G02B 27/0093 |
| JP | 6791198 B2 * | 11/2020 | B60K 35/00 |
| WO | WO-2017040924 A1 * | 3/2017 | G05D 1/0088 |
| WO | 2020/126375 A1 | 6/2020 | G06Q 30/02 |

OTHER PUBLICATIONS

Chinese Office Action, Application No. 2019800848914, 14 pages, dated Sep. 25, 2023.

* cited by examiner

METHOD AND DEVICE FOR MONITORING A PASSENGER OF A VEHICLE, AND SYSTEM FOR ANALYZING THE PERCEPTION OF OBJECTS

CROSS-REFERENCE TO RELATED APPLICATIONS

This application claims priority to German Patent Application No. DE 10 2018 133 445.1, filed on Dec. 21, 2018 with the German Patent and Trademark Office. The contents of the aforesaid Patent Application are incorporated herein for all purposes.

TECHNICAL FIELD

The present invention relates to a method for monitoring a passenger of a vehicle in which the geographic position of the vehicle is recorded, and a viewing direction of the passenger is recorded by means of a eye-tracking device. Furthermore, the invention relates to a device for monitoring a passenger of a vehicle that has a position recording apparatus for recording the geographic position of the vehicle, and an eye-tracking device for recording a viewing direction of the passenger. Finally, the invention relates to a system for analyzing the perception of objects in a traffic space that includes a plurality of vehicles that have the device for monitoring a passenger of the vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

For companies that set up objects with advertising content in a traffic space, the manner in which the advertising content is perceived by passengers of the vehicles that move in the traffic space is of interest. To record such perception, advertising objects are known in which sensors are integrated that recognize when a person is viewing the advertising object. In this case, it may be disadvantageous that high costs are incurred for the sensors in the advertising objects, and the range of the sensors is limited so that it cannot be recorded when passengers in vehicles passing by view the advertising object.

SUMMARY

An object exists to provide a method, a device, and a system of the aforementioned type with which the perception of an object in the environment of the vehicle by a vehicle passenger can be reliably detected.

The object is solved by a method, a device, and a system having the features of the independent claims. Embodiments of the invention are discussed in the dependent claims and the following description.

DESCRIPTION

Figure 1:
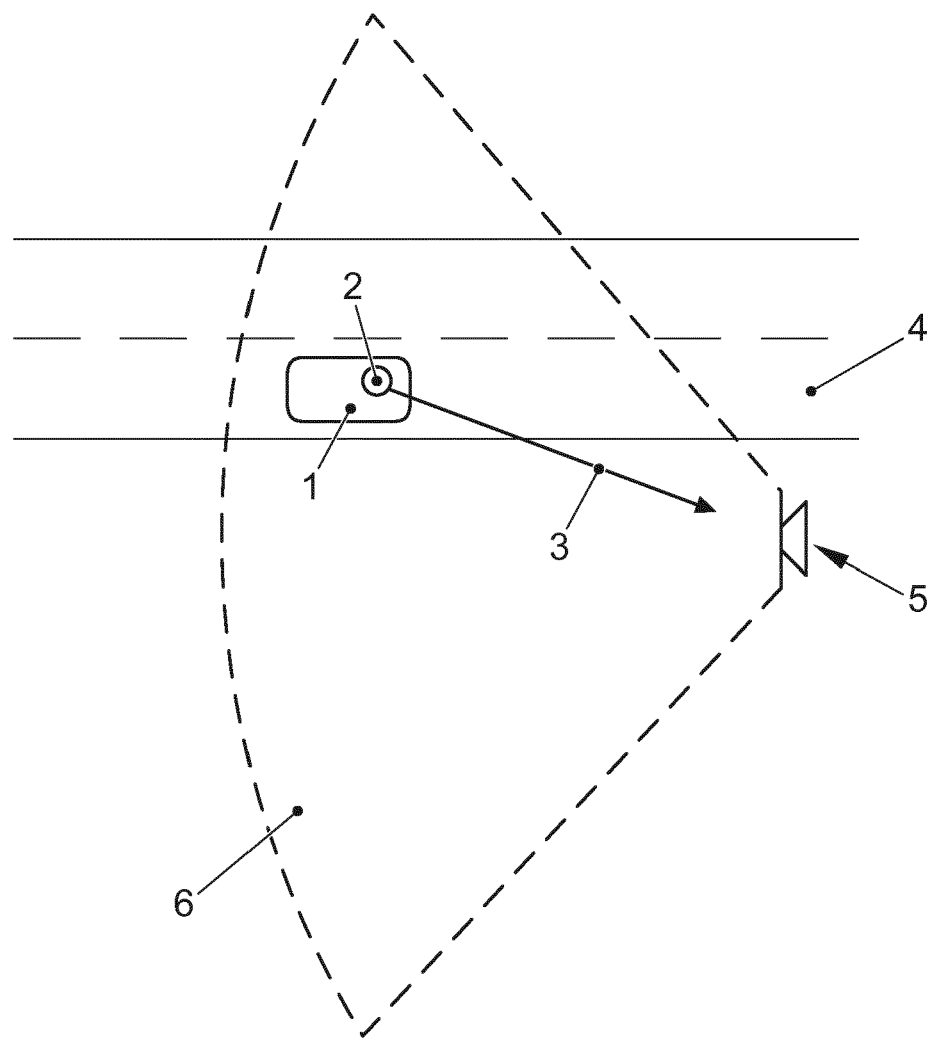
FIG. 1 illustrates the perception of an object by a vehicle passenger according to an exemplary embodiment of a method.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the method according to a first exemplary aspect, a data memory is accessed in which objects and geographic positions assigned to them are saved and, by using the recorded geographic position of the vehicle, it is detected whether one of the objects is located in the environment of the vehicle. Furthermore, depending on the recorded viewing direction of the passenger, the recorded geographic position of the vehicle, and the geographic position of the detected object in the environment of the vehicle, it is detected whether the object in the environment of the vehicle was perceived by the passenger.

With this method, it is unnecessary to record the environment of the vehicle in a manner such that objects are recognized that are relevant for monitoring the passenger of the vehicle. The objects relevant for monitoring the passenger of the vehicle are instead recorded by saving information assigned to them, which in particular includes the geographic position of the object, in a data memory that is accessed to detect whether one of the objects is located in the environment of the vehicle. The data memory may for example be located outside of the vehicle. The data memory is accessed in this case via a wireless communication interface for transmitting the current geographic position of the vehicle to the data memory, and for transmitting the geographic positions of objects in the environment of the vehicle from the data memory to the vehicle. The data memory is for example a non-vehicle server apparatus which is connected to the motor vehicle by means of a communication link, and/or a navigation system of the motor vehicle.

In some embodiments, the orientations of the saved objects are also saved in the data memory. Then, depending on the recorded viewing direction of the passenger, the recorded geographic position of the vehicle, and the geographic position and orientation of the detected object in the environment of the vehicle, it is detected whether the object in the environment of the vehicle was perceived by the passenger. These embodiments are particularly useful when the informational content shown by the object is only perceptible from one particular viewing direction.

The data memory may save in particular map data and the locations and orientations of the objects. Moreover, the objects may be classified. The objects may for example be advertising objects such as advertising posters. An orientation of such advertising objects is saved, by which a viewing direction may be detected. The viewing direction indicates the viewing angles from which the object can be visually perceived.

In some embodiments, a viewing area is assigned to the object depending on the geographic position and orientation of the object. Depending on the geographic position of the vehicle, it is detected whether the vehicle is located within the viewing area. If the vehicle is located within the viewing area, it is detected whether the object in the environment of the vehicle was perceived by the passenger by using the recorded viewing direction of the passenger.

The viewing area defines for example the area in which a vehicle must be located so that a passenger of the vehicle can perceive the object. For the perception of the object, a position within the viewing area is a necessary but insufficient condition since the visual perceptibility of the object may be restricted under restricted visual conditions such as in fog. In this manner, it may however be very easily determined if an object should be considered for further analysis. If the vehicle is located outside of the viewing area of an object, it does not have to be detected further whether the passenger of the vehicle has perceived this object.

In addition to a potential viewing angle, the viewing area may also define a minimum distance that is necessary to perceive the object. If the object includes for example writing of a certain size, a minimum distance may be defined that is necessary for a passenger of the vehicle to not just be able to see the object, but also to read the writing. In this case, a perception of the object is defined such that the content of the written message may be perceived.

In some embodiments, the viewing direction of the passenger is recorded in that the viewing direction of the passenger relative to the orientation of the vehicle is determined by means of the eye-tracking device, and the viewing direction of the passenger is then determined relative to the environment of the vehicle by using the orientation of the vehicle and the viewing direction of the passenger relative to the orientation of the vehicle. The orientation of the vehicle may be determined relatively easily by using the change over time of the geographic position of the vehicle. Moreover, the orientation may be detected in a known manner by the sensors located in the vehicle. The eye-tracking device then does not have to determine the viewing direction relative to the object in the environment of the vehicle, but rather only relative to the reference system of the vehicle. Since the eye-tracking device may be arranged within the vehicle, i.e., also within the reference system of the vehicle, eye tracking systems that are known per se may be used which are arranged in the vehicle and which track for example movements of the pupils of the driver or another vehicle passenger.

In some embodiments, how long the object in the environment of the vehicle was perceived by the passenger is detected depending on the recorded viewing direction of a passenger, and depending on the change of the recorded geographic position of the vehicle over time. Depending on the results of this determination of the duration of the perception of the object, the object is then, e.g., identified as perceived. For example, a minimum time interval may be defined. Only when the duration of the perception of the object exceeds this minimum time interval is the object identified as perceived. For example, whether the viewing direction is directed toward the object given the particular geographic position of the vehicle is determined continuously or at sequential points in time. Since the vehicle is moving, the viewing direction of the passenger must also change when he views an object for a certain duration. This change in the position of the vehicle and the change in the viewing direction associated therewith is taken into account in order to determine how long the object was perceived in the environment of the vehicle.

In some embodiments, metadata of a perceived object are detected. These metadata may for example comprise information on the advertising content shown by the object. Moreover, it may comprise information on the advertised product, or respectively the advertised company. The metadata may also be saved in the data memory. It may be retrieved by accessing the data memory. Detecting such metadata is beneficial for further analysis. It is moreover possible to output this metadata to the passenger of the vehicle. In this manner, the passenger may also later retrieve the information associated with the perceived object if he has already passed the object.

In some embodiments, the metadata of the perceived object changes over time. For example, the object may comprise a display that shows messages, advertising contents or other information such as for example traffic information at different time intervals. In this case, the point in time or the time interval in which the object was perceived by the passenger is recorded, and the metadata of the perceived object are detected at the point in time or the time interval at which the object was perceived. In this manner, not just that the object was perceived by the passenger may be recorded, but also the information which for example the object displayed at this point in time, or respectively within this time interval.

In some embodiments, it is detected whether informational content was being output by the detected object. Recognition data on output informational contents are then recorded. A conversation between passengers of the vehicle is recorded using a microphone in the interior of the vehicle, at least while the informational content is being output, or for a time interval afterward. Subsequently, an analysis is performed of the recorded conversation that was held while, or for an interval of time after, the outputting of the informational content, and it is detected whether the output informational content was perceived by a passenger of the vehicle using the conversation analysis and the recorded recognition data of the informational content output during or before the conversation. In this manner, it may be more precisely established whether the object was perceived by using informational content that was output by the object.

The time interval after the informational content is output may for example comprise a time period of up to 30 minutes after concluding the outputting the informational content. The time interval comprises for example a time period of 20 minutes, for example 10 minutes or 2 minutes, after concluding the outputting of the informational content.

The informational content is any form of information that is perceptible by a vehicle passenger. The informational content is for example advertising content. Advertising is therefore output, the content of which is perceptible by a passenger of the vehicle. In the present embodiments, the vehicle passenger is monitored to see if he has perceived the advertising content. To accomplish this, the content of a conversation between passengers of the vehicle is analyzed. By using this conversation analysis, a relationship with the recognition data of the associated informational content can be established. If such a relationship exists, it is concluded that the informational content was perceived by a vehicle passenger. Analyzing the conversation allows the perception of informational content and therefore the perception of the object that has output this informational content can be very reliably inferred.

In some embodiments, the recognition data are obtained by analyzing the output informational content. For example, visual output of the informational content may be recorded by a camera that captures the environment of the vehicle. The data recorded by a camera may then be analyzed in order to obtain recognition data for the informational content. In the present embodiments, the recognition data can be beneficially obtained solely by apparatuses of the vehicle without it being necessary to access vehicle-external apparatuses.

In some embodiments, recognition data on output informational contents of the detected object in the environment of the vehicle may be transmitted by the data memory to the vehicle. In the present embodiments, it is necessary to access vehicle-external apparatuses. In this case, the recognition data may however be obtained reliably and if applicable in a predetermined manner since data may be saved in the data memory that indicate which informational contents on the detected object are output at which time.

The recognition data may for example comprise keywords of the output informational content. As a consequence, a particularly reliable conversation analysis may be performed.

In some embodiments, the analysis of the recorded conversation that was held while or for a time interval after the informational content was output detects whether there is a correspondence between at least some of the keywords belonging to the informational content and words of the conversation. If words occur in the conversation that correspond to keywords of the informational content, it may be very reliably concluded that the conversation content is related to the output informational content. The keywords are therefore very special or very rarely occurring words in the informational content so that a clear delineation between a general conversation and a conversation about the output informational content is possible in the conversation analysis. In this manner, it can be particularly reliably verified if the monitored passenger has perceived the output informational content.

In some embodiments, the content of the conversation is detected and the reaction of at least one passenger to the informational content is determined in the analysis of the recorded conversation that was held during or for a time interval after the outputting of the informational content. It may for example be analyzed if the passenger has reacted positively, neutrally or negatively to the informational content. Beneficially in the present embodiments, it can be detected not only if the output of the informational content was perceived, but also what the reaction is to the informational content.

In some embodiments, the mood of the passenger is recorded by means of a mood recording apparatus at the point in time or time interval at which the object was perceived. To accomplish this, the mood recording apparatus may for example be coupled to an interior camera and/or a microphone. In this manner, the voice, the facial expressions and/or the gestures of the passenger can be analyzed and classified by the mood recording apparatus and thereby assigned to a certain mood.

Moreover, personal features of the passenger may be recorded. For example, the identity of the passenger, in particular the driver of the vehicle, can be detected using the vehicle key, or using an input upon starting the trip.

Alternatively, the personal features of the passenger are recorded by means of a passenger recording apparatus. This may access an interior camera and/or a microphone. In this manner, the age class and the gender of the passenger may for example be detected automatically. This information can help with the further evaluation of the data on the perceptions of objects.

In some embodiments, a vehicle-internal analytical apparatus records which object in the environment of the vehicle was perceived by which passenger when. Moreover, the vehicle-internal analytical apparatus may detect which metadata the perceived object possesses, how long the object was perceived, and/or which personal features and/or which mood the passenger had who perceived the object. The data recorded by the analytical apparatus may then be transmitted to a vehicle-external evaluation apparatus. This makes it possible to evaluate the data that were obtained while monitoring the vehicle passenger by a vehicle-external, in particular central evaluation apparatus in order to obtain data on the perception of objects. In doing so, the vehicle-external evaluation apparatus may for example detect how informational content belonging to metadata is perceived by using the data from a plurality of vehicles. Alternatively or in addition, it may determine the effectiveness of the outputting of the informational content.

The data memory may be at least one non-vehicle server apparatus which is connected to the motor vehicle by means of a communication link, and/or a navigation system of the motor vehicle.

A device according to a second exemplary aspect for monitoring a passenger of a vehicle comprises an interface for accessing a data memory in which objects and geographic positions assigned to them are saved. Furthermore, the device has an analytical apparatus that, by using the recorded geographic position of the vehicle, is designed to detect whether one of the objects is located in the environment of the vehicle, and furthermore to detect whether the object in the environment of the vehicle was perceived by the passenger depending on a recorded viewing direction of the passenger, a recorded geographic position of the vehicle, and a geographic position of a detected object in the environment of the vehicle.

The analytical apparatus is for example arranged within the vehicle. Contrastingly, the data memory is for example arranged outside of the vehicle. In this case, the interface is for example a wireless communication interface for a data exchange between the data memory and the analytical apparatus.

This device is designed for example to execute the method according to the first aspect. It accordingly also has the same benefits as the method.

Another exemplary aspect relates to a system for analyzing the perception of objects in a traffic space. The system comprises a plurality of vehicles that each comprise the above-described device. The vehicles each comprise an analytical apparatus. The system furthermore comprises a vehicle-external evaluation apparatus that is designed to communicate with the interfaces of the vehicles and to receive data from the analytical apparatuses of the vehicles that indicate which objects were perceived by the passengers of the vehicles. With this system, data may be obtained over a long time period on the perception of objects by passengers of the vehicles that pass the object which for example is arranged along the road edge.

The invention will now be explained based on further exemplary embodiments with reference to the drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

With reference to FIG. 1, the scenario will be explained in which the method according to the teachings herein is used:

A vehicle 1 with a passenger 2 such as the driver is driving on a roadway 4 of a street. An object 5 is positioned next to the street. This may be for example an advertising object such as an advertising poster. The object 5 possesses a certain orientation so that it can be perceived from a certain viewing area 6 by a person within this viewing area 6. The passenger 2 of the vehicle 1 that is located in the viewing area 6 can look along the viewing direction 3 in the direction of a surface of the object 5 on which informational content is depicted. In this manner, the passenger 2 can perceive the object 5 as well as the informational content depicted on the object 5. If the vehicle 2 moves past the object 5 on the roadway 4, the viewing direction 3 of the passenger 2 will change so that it is directed for a certain duration in the direction of the object 5 when the passenger 2 perceives the object, or respectively the depicted informational content.

Figure 2:
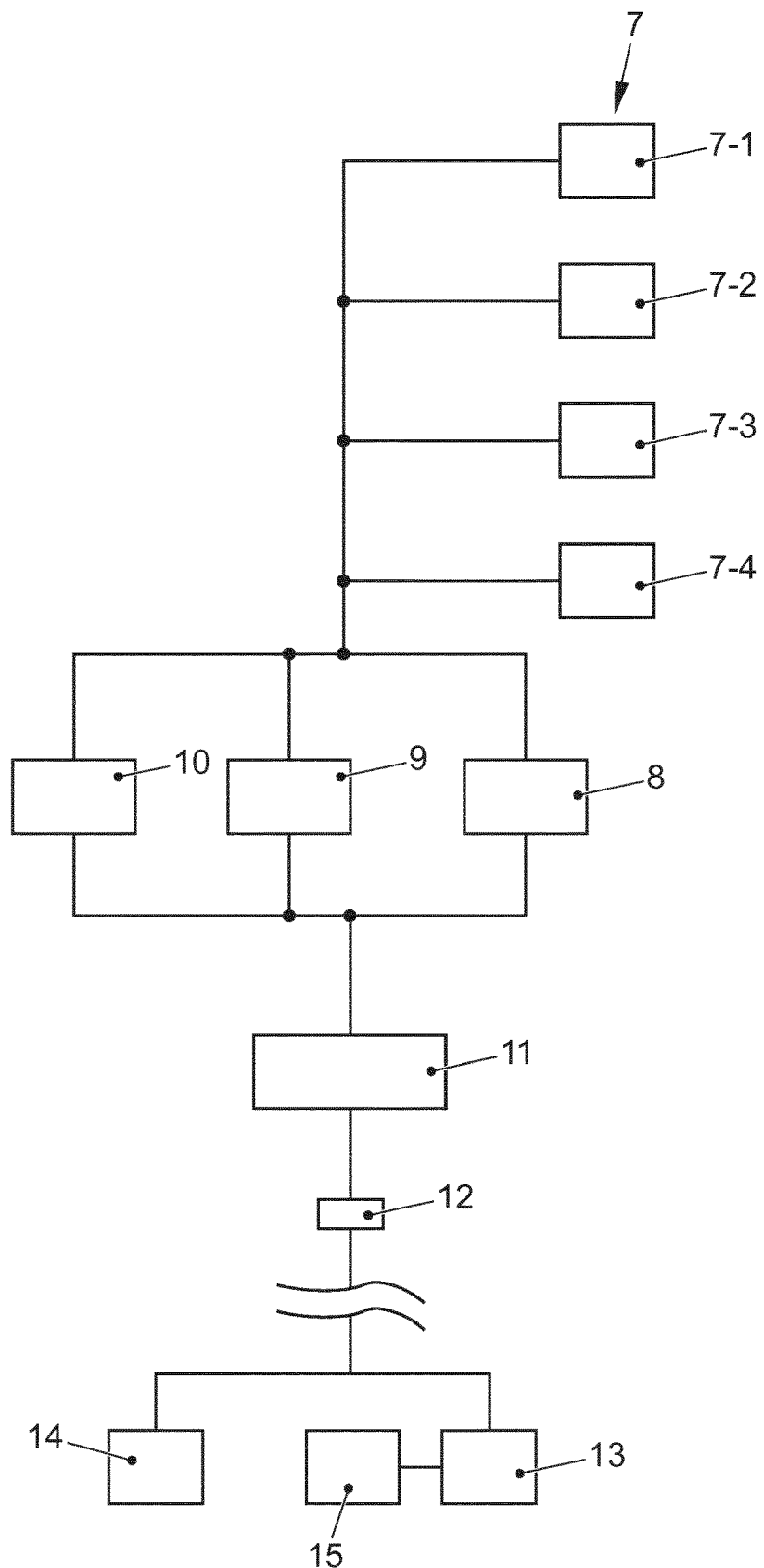
FIG. 2 shows an exemplary embodiment of a device.

An exemplary embodiment of the device according to the teachings herein as well as the method according to the teachings herein will be explained with reference to FIG. 2:

The vehicle 1 comprises various sensors 7. The sensors 7 comprise for example an interior camera 7-1, an interior microphone 7-2, an identification unit 7-3, and a position recording apparatus 7-4. The sensors 7 are coupled to a eye-tracking device 8, a mood recording apparatus 9 and a passenger detection apparatus 10.

Based on the data picked up by the sensors 7, the eye-tracking device 8 can record the viewing direction 3 of a vehicle passenger relative to the reference system of the vehicle 1. The eye-tracking device 8 can accordingly comprise an eye tracking system. For example, the direction in which the passenger 2 looks toward a vehicle window, for example the windshield or a side window, is recorded. Furthermore, the position of the eyes of the passenger 2 within the vehicle 1 can be detected, from which the viewing direction 3 can then be calculated.

The mood recording apparatus 9 can record the mood of the passenger 2 at a certain point in time or at a time interval by using the data transmitted by the sensors 7. For example, the facial expressions, gestures and the voice of the passenger 2 can be analyzed and assigned to a specific mood class.

The passenger recording apparatus 10 can record personal features of the passenger 2 using the data recorded by the sensors 7. On the one hand, the identity of the passenger 2 can be detected directly by the identification unit 7-3, for example using a key personally assigned to the passenger 2. Alternatively or in addition, the personal features of the passenger 2 can be detected by an image analysis and/or voice analysis.

The viewing direction 3 of the passenger 2 recorded by the eye-tracking device 8, the mood of the passenger 2 recorded by the mood recording apparatus 9, and the personal features of the passenger 2 recorded by the passenger recording apparatus 10 are transmitted continuously or within certain time intervals to a vehicle-internal analytical apparatus 11. Moreover, the current geographic position of the vehicle 1 as well as the pose, i.e., the spatial position, or respectively the orientation of the vehicle 1 is recorded by the position recording apparatus 7-4 and transmitted continuously to the analytical apparatus 11. In this manner, the analytical apparatus 11 can detect the speed and the direction of movement of the vehicle 1.

The vehicle-internal analytical apparatus 11 is coupled by the communication interface 12, for example a datalink via the mobile telephone network, to an object detection apparatus 13. The object detection apparatus 13 in turn accesses a data memory 15. Data on objects 5 are saved in the data memory 15 that are relevant for monitoring the passenger 2. The data memory 15 saves geographic positions that are assigned to the objects 5. Moreover, orientations assigned to the objects are saved in the data memory when the object can only be perceived from certain viewing directions. For example, the objects 5 can be advertising objects, objects that show information and instructions, or other objects 5, the perception of which by a passenger 2 is of interest. Metadata on the objects 5 can also be saved. This includes data on the viewing area 6, data on informational content, in particular advertising content, shown by the object 5, and time data that may indicate which informational content was, or respectively is displayed when. The informational content may also comprise information on an advertised product and an advertised company.

The vehicle-internal analytical apparatus 11 is furthermore connected by the wireless communication interface 12 to a vehicle-external evaluation apparatus 14.

In the following, it will be described how the passenger 2 of the vehicle 1 is monitored in the method according to the teachings herein, wherein the designs of the different apparatuses of the device according to the teachings herein will be further explained:

The geographic position of the vehicle 1 is continuously recorded by the position recording apparatus 7-4. By means of the vehicle-internal analytical apparatus 11, the position of the vehicle 1 is transmitted continuously via the communication interface 12 to the object detection apparatus 13. By accessing the data memory 15, the object detection apparatus 13 detects those objects 5 that are located in the environment of the vehicle 1 depending on the geographic position of the vehicle 1 transmitted by the analytical apparatus 11. For example, the object detection apparatus 13 can determine whether the vehicle 1 is located within the viewing area 6 of an object 5. The object detection apparatus 13 then transmits data on the objects 5 in the environment of the vehicle 1 back to the analytical apparatus 11. These data include the geographic position and the orientation of the object 5. Furthermore, the data can comprise a timestamp and all or a subset of the aforementioned metadata of the object 5.

Moreover, the viewing direction 3 of the passenger 2 is recorded continuously. If the viewing direction 3 relative to the reference system of the vehicle 1 is recorded, the analytical apparatus 11 continuously calculates the viewing direction 3 of the passenger 2 in the reference system of the roadway 4 in which the object 5 is located taking into account the movement of the vehicle 1. In this reference system, it is in particular stationary. Then, depending on the recorded current viewing direction 3 of the passenger 2, the recorded current geographic position of the vehicle 1, and the geographic position and orientation of the object 5 in the environment of the vehicle 1, the analytical apparatus 11 determines whether the object 5 in the environment of the vehicle 1 was perceived by the passenger 2. If an object 5 can only be perceived at a certain orientation relative to a viewer, the orientation of the detected object 5 in the environment of the vehicle 1 is moreover taken into account in the determination of whether the object 5 was perceived in the environment of the vehicle 1 by the passenger 2. Such an orientation for example of a flat object 5 is to be taken into account when the object 5 should only be identified as perceived when it was perceived from a certain viewing direction, i.e., when for example a surface with depicted information was perceived, and not just the object itself.

Moreover, the analytical apparatus 11 records the point in time at which and how long the object 5 was perceived by the passenger 2. This information is saved in an internal memory of the analytical apparatus 11. In conjunction therewith, the recorded mood of the passenger 2 while he perceived the object 5 is moreover saved, as well as the personal features of the passenger 2.

While the vehicle 1 is driving on the streets of the traffic area, the aforementioned information is repeatedly saved in the internal memory of the analytical apparatus 11 when the vehicle 1 passes an object 5. This saved information can then be transmitted via the communication interface 12 or otherwise to the vehicle-external evaluation apparatus 14 which can thereby further evaluate the data that was obtained while monitoring the passenger 2 of the vehicle 1.

In the following, a development of the above-described exemplary embodiment will be explained, wherein potential other embodiments of the different apparatuses of the device according to the teachings herein will also be further explained:

Informational content is displayed by the object 5 in this development. It can be a stationary display or a varying display. The analytical apparatus 11 detects whether informational content was output by the detected object 5.

The informational content is in particular advertising content. Recognition data and possibly metadata are associated with the informational content. The recognition data are keywords that are related to the informational content. The keywords can be words that are visually displayed while the informational content is being output. The recognition data, in particular the keywords, can however also be otherwise related to the informational content. It is not absolutely necessary for the keywords to be output displayed. The recognition data is related to the informational content such that, by using the recognition data, it can be detected if a user has perceived the output of the informational content. For example, the recognition data may also contain keywords which are related to the informational content in a figurative sense. For example, the keywords can be such that are spoken with a high probability in a conversation about the informational content without the keywords themselves occurring in the informational content. The keywords are chosen in particular such that the frequency of occurrence of these words is minimal enough for the keywords to be mentioned with a low probability in another context.

If the analytical apparatus 11 has detected that informational content is being output by an object 5, it records recognition data on output informational contents. For example, the analytical apparatus 11 can obtain the recognition data in that recognition data on output informational contents of the detected object 5 in the environment of the vehicle 1 are transmitted by the data memory 15 to the analytical apparatus 11. To accomplish this, the data memory 15 can save not just which time which informational content was displayed by which object 5, but it can also save the assigned recognition data.

Alternatively, the analytical apparatus 11 records recognition data on output informational contents in that it evaluates the data transmitted by the sensors 7. For example, it can extract depicted text by using the pictures taken by the interior camera 7-1 and generate recognition data, in particular keywords, therefrom.

The analytical apparatus 12 furthermore receives recordings from the interior microphone 7-2. It is designed to analyze a conversation recorded during the output of informational content, or for a time interval after the outputting of informational content. By using this conversation analysis and the recorded recognition data of the informational content output during or before the conversation, the analytical apparatus 12 detects whether the output informational content was perceived by a passenger of the vehicle 1. In doing so, the analytical apparatus 12 extracts in particular words of the recorded conversation while the information is being output or in a time interval afterwards, and compares these extracted words to keywords of the recognition data. If a certain degree of correspondence is detected, the analytical apparatus 12 can verify that a passenger 2 has perceived the object 5 which has output the informational content.

In the system for analyzing the perception of objects 5 in a traffic space, a plurality of vehicles 1 is equipped with the above-described device according to the teachings herein. The vehicles 1 monitor one or more passengers 2 of the particular vehicle 1 with respect to the perception of objects 5. The particular analytical apparatus 11 of a vehicle 1 records which object 5 was perceived at which point in time by which passenger 2. Furthermore, the aforementioned metadata on the perception of the object 5 can be recorded. The data recorded by the analytical apparatuses 11 are transmitted to the vehicle-external evaluation apparatus 14 so that it can comprehensively evaluate how a certain object was perceived.

The vehicle-external evaluation apparatus detects, by using the data from a plurality of vehicles, how informational content belonging to metadata is perceived.

LIST OF REFERENCE NUMERALS

1 Vehicle
2 Passenger
3 Viewing direction
4 Roadway
5 Object
6 Viewing area
7 Sensors
7-1 Interior camera
7-2 Interior microphone
7-3 Identification unit
7-4 Position recording apparatus
8 Eye-tracking device
9 Mood recording apparatus
10 Passenger recording apparatus
11 Vehicle-internal analytical apparatus
12 Communication interfaces
13 Object detection apparatus
14 Evaluation apparatus
15 Data memory The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not

What is claimed is:

1. A method for monitoring at least a passenger of a vehicle comprising:
   detecting a geographic position of the vehicle;
   detecting a viewing direction of the passenger by an eye-tracking device;
   accessing a data memory in which objects and geographic positions assigned to them are saved and, by using the detected geographic position of the vehicle, determining whether one of the objects is located in the environment of the vehicle;
   determining, depending on the detected viewing direction of the passenger, the detected geographic position of the vehicle, and the geographic position of the determined object in the environment of the vehicle, whether the object in the environment of the vehicle was perceived by the passenger;
   detecting whether informational content is output by the detected object;
   in case informational content is output by the detected object:
      determining recognition data on the output informational content;
      recording a conversation between passengers of the vehicle using a microphone in the interior of the vehicle during one or more of: while the informational content is being output and a time interval after the informational content is being output;
      conducting an analysis of the recorded conversation; and
      verifying, by using the analysis and the determined recognition data of the informational content, whether the output informational content was perceived by the passenger of the vehicle.

2. The method of claim 1, wherein
   one or more orientations of the objects are also saved in the data memory; and
   depending on the detected viewing direction of the passenger, the detected geographic position of the vehicle, and the geographic position and one or more orientations of the determined object in the environment of the vehicle, determining whether the object in the environment of the vehicle was perceived by the passenger.

3. The method of claim 2, further comprising:
   assigning a viewing area to the object depending on the geographic position and orientation of the object;
   depending on the geographic position of the vehicle, detecting whether the vehicle is located within the viewing area; and
   if the vehicle is located within the viewing area, detecting whether the object in the environment of the vehicle was perceived by the passenger by using the detected viewing direction of the passenger.

4. The method of claim 3, further comprising:
   determining an orientation of the vehicle; wherein
   the viewing direction of the passenger is detected by determining the viewing direction of the passenger relative to the orientation of the vehicle by the eye-tracking device; and
   the viewing direction of the passenger is determined relative to the environment of the vehicle by using the orientation of the vehicle and the viewing direction of the passenger relative to the orientation of the vehicle.

5. The method of claim 3, further comprising:
   detecting how long the object in the environment of the vehicle was perceived by the passenger depending on the detected viewing direction of a passenger, and depending on the change of the detected geographic position of the vehicle over time; and
   depending on the results of the detection of the duration of the perception of the object, identifying the object as perceived.

6. The method of claim 2, further comprising:
   determining an orientation of the vehicle; wherein
   the viewing direction of the passenger is detected by determining the viewing direction of the passenger relative to the orientation of the vehicle by the eye-tracking device; and
   the viewing direction of the passenger is determined relative to the environment of the vehicle by using the orientation of the vehicle and the viewing direction of the passenger relative to the orientation of the vehicle.

7. The method of claim 2, further comprising:
   detecting how long the object in the environment of the vehicle was perceived by the passenger depending on the detected viewing direction of a passenger, and depending on the change of the detected geographic position of the vehicle over time; and
   depending on the results of the detection of the duration of the perception of the object, identifying the object as perceived.

8. The method of claim 1, further comprising:
   determining an orientation of the vehicle; wherein
   the viewing direction of the passenger is detected by determining the viewing direction of the passenger relative to the orientation of the vehicle by the eye-tracking device; and
   the viewing direction of the passenger is determined relative to the environment of the vehicle by using the orientation of the vehicle and the viewing direction of the passenger relative to the orientation of the vehicle.

9. The method of claim 8, further comprising:
   detecting how long the object in the environment of the vehicle was perceived by the passenger depending on the detected viewing direction of a passenger, and depending on the change of the detected geographic position of the vehicle over time; and
   depending on the results of the detection of the duration of the perception of the object, identifying the object as perceived.

10. The method of claim 1, further comprising:
    detecting how long the object in the environment of the vehicle was perceived by the passenger depending on the detected viewing direction of a passenger, and depending on the change of the detected geographic position of the vehicle over time; and
    depending on the results of the detection of the duration of the perception of the object, identifying the object as perceived.

11. The method of claim 1, further comprising detecting metadata of a perceived object, and/or determining personal features of the passenger.

12. The method of claim 1, further comprising: transmitting recognition data on output informational content of the detected object in the environment of the vehicle by the data memory to the vehicle.

13. The method of claim 1, further comprising determining the mood of the passenger by a mood recording apparatus at the point in time or time interval at which the object was perceived.

14. The method of claim 1, further comprising determining personal features of the passenger.

15. The method of claim 1, wherein a vehicle-internal analytics circuit determines which object in the environment of the vehicle was perceived by which passenger when.

16. The method of claim 15, wherein the vehicle-internal analytics circuit furthermore detects which metadata the perceived object possesses, how long the object was perceived, and/or which personal features and/or which mood the passenger had who perceived the object.

17. The method of claim 15, wherein the data recorded by the analytics circuit are transmitted to a vehicle-external evaluation circuit, and in particular the vehicle-external evaluation circuit receives the transmitted data from a plurality of vehicles and detects how informational content belonging to metadata is perceived, and/or determines the effectiveness of outputting the informational content.

18. A device for monitoring at least a passenger of a vehicle, comprising:
   a position detecting circuit for detecting a geographic position of the vehicle;
   an eye-tracking device for detecting a viewing direction of the passenger;
   an interface for accessing a data memory in which objects and geographic positions assigned to them are saved; and
   an analytics circuit that, by using the recorded geographic position of the vehicle, is configured to:
      determine whether one of the objects is located in the environment of the vehicle, and furthermore to determine whether the object in the environment of the vehicle was perceived by the passenger depending on a detected viewing direction of the passenger, a detected geographic position of the vehicle, and a geographic position of a determined object in the environment of the vehicle
      detect whether informational content is output by the detected object;
      in case informational content is output by the detected object:
         determine recognition data on the output informational content;
         record a conversation between passengers of the vehicle using a microphone in the interior of the vehicle during one or more of: while the informational content is being output and a time interval after the informational content is being output;
         conduct an analysis of the recorded conversation; and
         verify, by using the analysis and the determined recognition data of the informational content, whether the output informational content was perceived by the passenger of the vehicle.

19. A system for analyzing the perception of objects in a traffic space, wherein the system comprises:
   a plurality of vehicles that each comprise a device according to claim 18, wherein the vehicles each comprise the analytics circuit, and
   a vehicle-external evaluation circuit that is configured to communicate with the interfaces of the vehicles and to receive data from the analytics circuits of the vehicles that indicate which objects were perceived by the passengers of the vehicles.

20. A method for monitoring a passenger of a vehicle comprising:
   detecting a geographic position of the vehicle;
   detecting a viewing direction of the passenger by an eye-tracking device;
   accessing a data memory in which objects and geographic positions assigned to them are saved and, by using the detected geographic position of the vehicle, determining whether one of the objects is located in the environment of the vehicle;
   determining, depending on the detected viewing direction of the passenger, the detected geographic position of the vehicle, and the geographic position of the determined object in the environment of the vehicle, whether the object in the environment of the vehicle was perceived by the passenger;
   detecting whether informational content was output by the detected object;
   determining recognition data on the output informational content;
   recording a conversation between passengers of the vehicle using a microphone in the interior of the vehicle, at least while the informational content is being output, or for a time interval afterward;
   conducting an analysis of the recorded conversation that was held while or for a time interval after the informational content was output; and
   detecting, by using the conversation analysis and the recorded recognition data of the informational content output during or before the conversation, whether the output informational content was perceived by a passenger of the vehicle.

\* \* \* \* \*